United States Patent [19]

Gering

[11] Patent Number: 5,761,376
[45] Date of Patent: Jun. 2, 1998

[54] SYSTEM AND METHOD OF MOTOR CONTROL

[75] Inventor: David T. Gering, Waukesha, Wis.

[73] Assignee: General Electric Company, Milwaukee, Wis.

[21] Appl. No.: 851,363

[22] Filed: May 5, 1997

[51] Int. Cl.$^6$ ....................................................... H02P 5/06
[52] U.S. Cl. .............................................. 388/844; 318/271
[58] Field of Search ................................... 318/268, 271, 318/449, 461, 700, 705; 388/809, 842, 844, 847, 911

[56] References Cited

U.S. PATENT DOCUMENTS

| | | |
|---|---|---|
| 4,006,977 | 2/1977 | Harrow et al. . |
| 4,019,814 | 4/1977 | Blaschke . |
| 4,175,840 | 11/1979 | Kittag . |
| 4,183,635 | 1/1980 | Dorig . |
| 4,430,746 | 2/1984 | Suzuki et al. . |
| 4,449,225 | 5/1984 | Tammisalo . |
| 4,783,793 | 11/1988 | Virta et al. . |

*Primary Examiner*—Bentsu Ro
*Attorney, Agent, or Firm*—B. Joan Haushalter; John H. Pilarski

[57] ABSTRACT

A method and system are provided for controlling a motor to rapidly accelerate and synchronize with an external synchronization pulse. First, the motor is accelerated to only half of the desired speed. At this point, the phase error with the sync pulse is calculated, and the motor continues "cruising" at half speed until the phase discrepancy diminishes. Then the motor rises to the full desired speed at the optimal time such that it is in phase with the sync pulse just as it reaches full speed. The acceleration is performed at a constant, yet slow enough, rate to receive at least three speed feedbacks. Then the instantaneous speed can be accurately measured and the next (and final) speed command during acceleration is interpolated between the ideal command for rising and the ideal command for cruising at the desired speed. The amount of phase discrepancy that diminishes while rising, as well as the ideal motor commands for cruising and rising, at both half and full speeds are adaptively learned and stored for the next run.

20 Claims, 3 Drawing Sheets

FIG. 2

| STATE | SPEED CONTROL LOOP | PHASE CONTROL LOOP | WHEN TO ADVANCE TO NEXT STATE |
|---|---|---|---|
| IDLE | OFF | OFF | EXPOSURE SWITCH IS PRESSED |
| HALF RISE | STEADY ACCELERATION UNTIL LAST TACH | OFF | SPEED RISES TO HALF THE DESIRED SPEED |
| HALF SHUTTER | MAINTAIN HALF SPEED | MEASURE PHASE_LEAD | SHUTTER INTERRUPT OCCURS |
| HALF CRUISE | MAINTAIN HALF SPEED | MONITOR PHASE_LEAD | WAIT UNTIL PHASE_LEAD HAS REDUCED TO EQUAL RISE_PHASE_LOSS |
| FULL RISE | STEADY ACCELERATION UNTIL LAST TACH | OFF | SPEED RISES TO THE DESIRED SPEED |
| FULL SHUTTER | MAINTAIN FULL SPEED | MEASURE PHASE_LEAD | SHUTTER INTERRUPT OCCURS |
| FULL CRUISE | MAINTAIN FULL SPEED | MAINTAIN SYNCHRONIZATION | EXPOSURE SWITCH RELEASED |

28

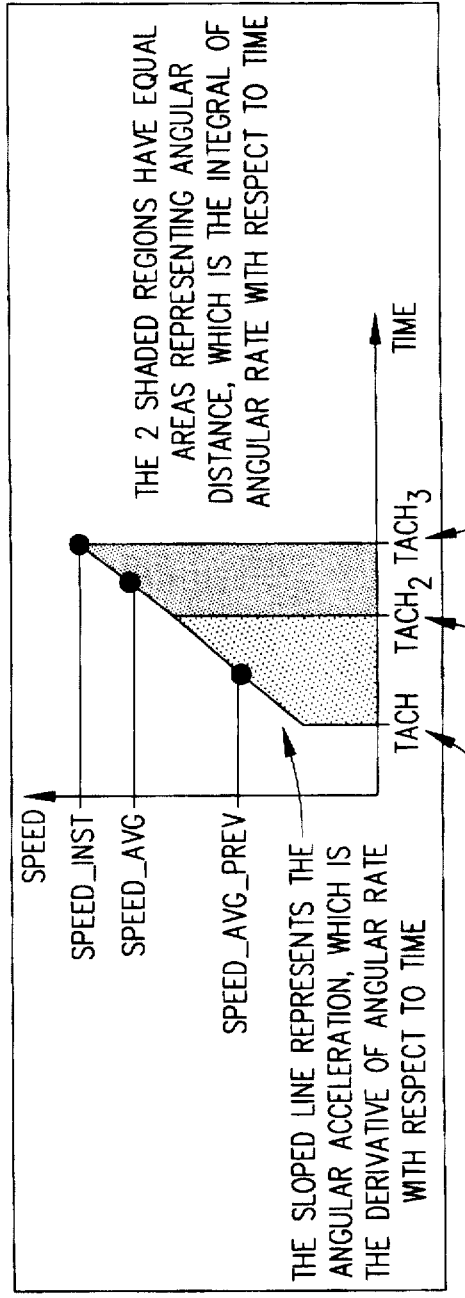

FIG. 3

SYSTEM AND METHOD OF MOTOR CONTROL

TECHNICAL FIELD

The present invention relates to DC motors and, more particularly, to an adaptive, non-linear control algorithm to bring a DC motor up to speed and in phase with an externally applied synchronization signal.

BACKGROUND ART

Vascular radiology is performed with x-ray imaging equipment that often generates 15 or 30 exposures per second. The x-ray image, after being converted to an optical image, is split between a cinematic camera and a video camera. The exposure sequences are recorded either digitally, or to cinematic film, or both. Recording to both has often been used since film has better image quality, yet digital disc storage is convenient and avoids the high cost of film storage.

The cinematic camera has a motor with an attached shutter, which is a disc with a hole in it, that exposes a frame of film each time the hole passes over the film strip. When the spinning shutter is not synchronized with the digital recording, then black bars appear on either the film or the digital images when recording at 30 Frames-Per-Second (FPS), and entire portions of the image are dark at 15 FPS.

If shutter acceleration begins too much prior to the x-ray exposure sequence, then expensive film is wasted. If acceleration occurs too slowly, then the access time, or the delay between when the doctor signals a desire to expose, and the actual exposures begin, is prohibitively long. In the prior art, minimizing wasted film and access time resulted in a lack of synchronization during the beginning of exposure sequences, thus producing the dark "sync bars".

In the prior art, a linear speed control loop would normally accelerate the cinematic camera's shutter motor up to the desired speed, and then a linear phase control loop would adjust the speed up and down to come into phase with the sync pulse. At slow frame rates, the feedback to these linear, closed-loop control systems is too sparse, making this actually a sequence of open-loop systems. The shutter could accelerate quickly, but coming into phase with the digital recording would be too sluggish.

It would be desirable then to be able to bring a motor both up to speed and in phase with an external synchronization signal quickly enough to avoid increasing access time or wasting film.

SUMMARY OF THE INVENTION

The present invention provides a motor control system and method that solves the problem of scrolling black bars and partially dark images when simultaneously recording images digitally and to film. Compared to the prior art, neither the access time nor the amount of wasted film are significantly increased.

In accordance with one aspect of the present invention, there is provided a method for controlling the motor to rapidly accelerate and synchronize with an external synchronization pulse. First, the motor is accelerated to only half of the desired speed. At this point, the phase error with the sync pulse is calculated, and the motor continues "cruising" at half speed until the phase discrepancy diminishes. Then the motor rises to the full desired speed at the optimal time such that it is in phase with the sync pulse just as it reaches full speed. This value of optimal time varies greatly with cable resistance, opposing torque from film cartridges, power supply voltage, power line frequency, and variances in motor construction. Consequently, the control scheme begins with a default value which is automatically calibrated by adjusting the parameter after each run, and storing it for use on the next run.

Secondly, the invention overcomes the overshoot inherent in a speed control system with sparse feedback by performing the acceleration at a constant, yet slow enough, rate to receive at least three speed feedbacks. Then the instantaneous speed can be accurately measured and the next (and final) speed command during acceleration is interpolated between the ideal command for rising and the ideal command for cruising at the desired speed. The ideal "rising" and "cruising" commands are adaptively learned. The ideal command for rising will accelerate the motor as fast as possible, and yet still be slow enough to obtain at least three speed feedbacks. The ideal command for cruising is measured from the commands used for cruising during the steady-state portions of the previous run.

Accordingly, it is an object of the present invention to rapidly bring a motor both up to speed and in phase with an external synchronization signal. It is a further object of the present invention to provide fast access time when recording images simultaneously digitally and to cinematic film. The present invention has the advantages of minimizing cinematic film waste and adapting to different operating conditions.

Other objects and advantages of the invention will be apparent from the following description, the accompanying drawings and the appended claims.

BRIEF DESCRIPTION OF THE DRAWINGS

FIG. 2 is a table illustrating the state machine setup which is followed by the control scheme according to the present invention;

FIG. 3 is a graphical representation of speed measured during acceleration; and

DETAILED DESCRIPTION OF THE PREFERRED EMBODIMENTS

The control system and method according to the present invention is used in conjunction with conventional, linear speed and phase control loops, yet it solves the problems these approaches encounter when used alone. A linear speed control loop would normally accelerate the cinematic camera's shutter motor up to the desired speed, and then a linear phase control loop would adjust the speed up and down to come into phase with the sync pulse. At slow frame rates, the feedback to these linear, closed-loop control systems is too sparse, making this actually a sequence of open-loop systems.

The control approach of the present invention first brings the cinematic camera's motor up to half of the desired speed. This phase control system and method requires constant speeds during "cruising", so the present invention allows for a new speed control method to prevent speed overshoots at the conclusion of "rising" stages. The hardware provides sparse readings of average speed over discrete intervals. The motor accelerates at a constant rate that is just slow enough to receive at least three readings of average speed, which is the minimum required to accurately calculate instantaneous speed. When the motor speed would overshoot before the next speed feedback is received, the acceleration is reduced appropriately to not overshoot. The next motor command after that is the optimal value for cruising. The motor commands for rising and cruising, at both half and full speeds, are also learned and stored for use on the next run. During the "cruising" states, the conventional, linear speed control algorithm is used to maintain constant speed. When the motor is at full speed and fully in phase, the conventional, linear phase control loop is run to maintain synchronization.

Figure 1:
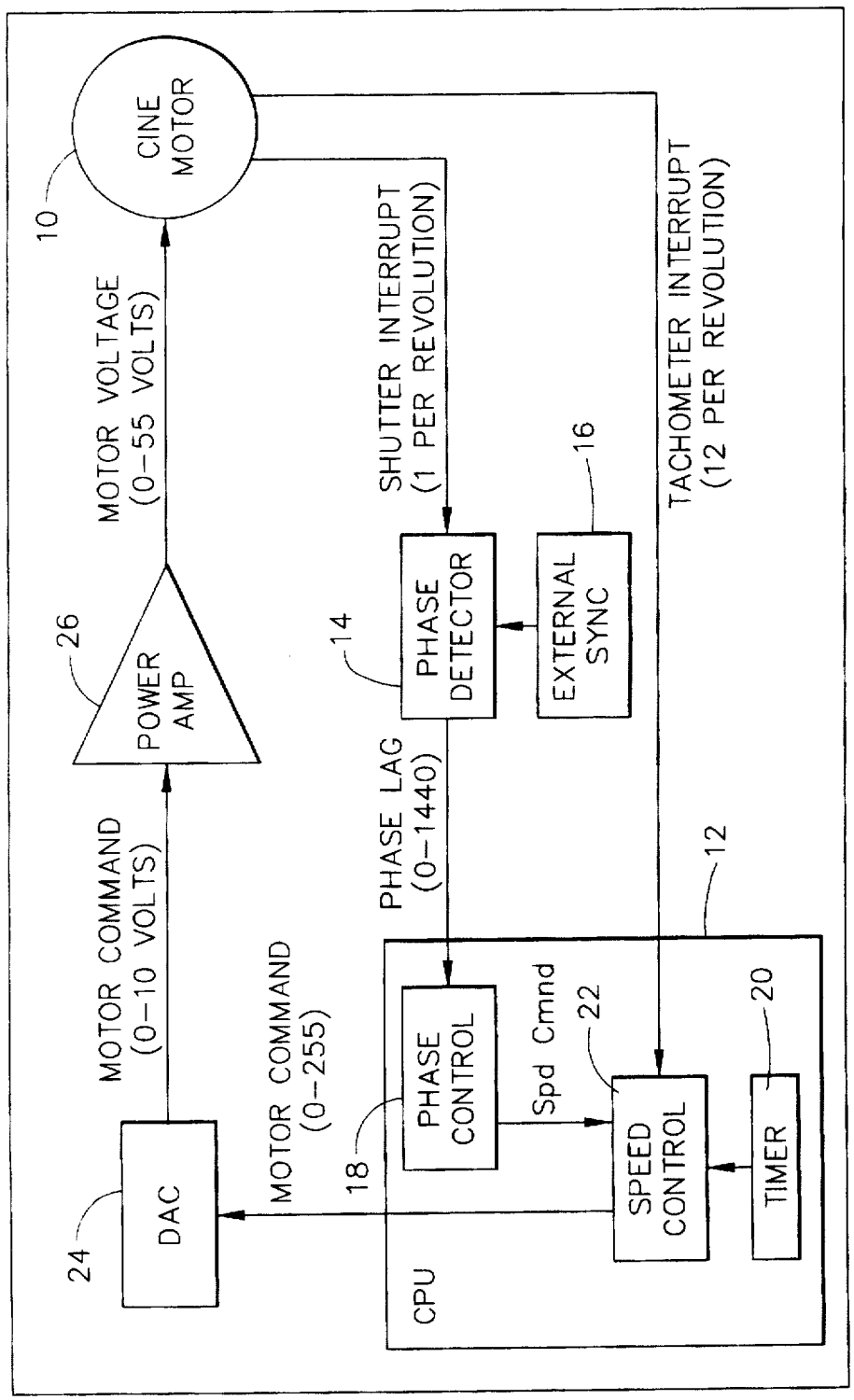
FIG. 1 is a prior art block diagram of the hardware for the motor controller.

Referring now to the drawings, FIG. 1 illustrates a prior art hardware block diagram of a motor control system. The control method of the present invention is designed for use with the control hardware of FIG. 1. A DC, permanent-magnet cinematic camera motor 10 spins a disk, called the shutter blade. The blade has an opening that passes over the film once per revolution. The spinning blade emits one shutter pulse and twelve tachometer pulses each revolution. These pulses are used by controller 12 as feedback in a closed-loop control system.

Phase detection circuitry of phase block 14 measures the amount by which the shutter pulses lag external synchronization pulses of external sync block 16. The camera's shutter pulse triggers an interrupt which runs the software routine that performs the phase control loop 18. This routine reads the output of the phase detection 14 circuitry, which is between 0 and 1440, where each increment represents ¼ of a degree.

Micro-controller 12 has an internal, 16-bit timer 20 counting continuously in microsecond increments. The motor's tachometer pulses trigger an interrupt, which may be referred to as a "tach", during which the timer's output is read and converted to a speed value in the speed control software routine 22. The speed controller 22 commands the motor 10 voltage by outputting an unsigned integer between 0 and 255 to a Digital-to-Analog Converter (DAC) 24. The DAC 24 outputs an analog signal between zero and ten volts that is sent to power amplifier 26. The power amplifier 26 outputs a voltage between zero and fifty-five volts to the motor 10 windings that is current-limited to nine amps at startup, and six amps thereafter.

The control scheme according to the present invention follows an algorithmic state machine having seven different states, as illustrated in table 28 of FIG. 2. The speed and phase control loops have different functions in each state, as summarized in table 28. The nonlinear speed control algorithm according to the present invention is run only during the "rising" states, and the conventional, linear, speed control loop is run during the "cruising" states.

Continuing with FIGS. 1 and 2, during the Half Rise State, the motor 10 accelerates from a full stop to half of the desired speed at a constant rate until the last tach of this state. During the last tach_interval (i.e., the time between two consecutive tachs), the acceleration is reduced appropriately to not overshoot the half speed mark. The conventional, linear, speed and phase control loops are turned off during this state.

During each tach_interval, the shutter blade rotates through an angular distance, according to the following equation:

$$\text{angle} = 360°/12 \text{ tachs} = 30° \text{ per tach}$$

Therefore, the speed calculated in accordance with the prior art was the angle divided by the time expired between two consecutive tachs. It is important to realize that this method measures only the average speed of the motor during the time between the two tachs; whereas the phase control according to the present invention requires the instantaneous speed for maximum accuracy. Therefore, when the motor is accelerating at a constant rate, the current instantaneous speed is approximated as follows, where speed_avg_prev is the average speed measured after the previous tach:

$$\text{speed\_inst} = \text{speed\_avg} + (\text{speed\_avg} - \text{speed\_avg\_prev})/2$$

This calculation is a close approximation, but it can be used because of its computational efficiency, since computation time is very limited during tachometer interrupts.

Referring to FIG. 3, it should be noted that there must be at least three tachs 30, 32, 34, before the first instantaneous speed measurement can be obtained. Two tachs would not be enough since one does not know how far the shutter rotated before the first tach occurred. At each tach following second tach 32 of this state, a decision is made whether this tach will be the last tach of the state. If the difference in the average speeds during the previous two tach intervals is more than the difference between the current instantaneous speed and the speed command, then the speed would overshoot during the next tach.

To prevent overshoot, the motor command for the last tach_interval of "rising", is interpolated between the motor command used for "rising", and the motor command used for "cruising", by the following formula:

$$\text{last\_motor\_cmd} = \text{cruise\_motor\_cmd} + (\text{speed\_cmd} - \text{speed\_inst})/(\text{speed\_avg} - \text{speed\_avg\_prev}) * \text{rise\_motor\_cmd}$$

During the Half Shutter State, the motor remains at half speed while waiting for a shutter interrupt to occur. The first motor command used in this state is a "learned" value, and the conventional, linear speed control loop is turned on. When a shutter interrupt occurs, the phase_lead is calculated. The phase lead is the amount of phase by which the shutter signal leads the sync signal. In this cinematic application, a phase_lead causes the bottom portion of the image to be dark. The fraction of the image that is dark is equal to the fraction of 360° by which the motor leads the sync signal in phase. Therefore, a very small phase lag, such that the sync pulse occurs just before the shutter opens, causes an entire dark frame.

During the Half Cruise State, at each tach, the average shutter speed during the tach_interval is measured by a hardware timer counting the number of microseconds that occurred during the tach_interval. This speed is used to calculate how much phase was lost during the tach_interval due to the motor revolving at a lower frequency than the synchronization signal. For example, if the motor is spinning at half as many revolutions per second as is desired, then the motor takes twice as long to go through a full cycle as the synchronization signal does, and so the motor loses 360 degrees of phase over a period of time equal to two periods of the synchronization signal. Phase_loss is calculated by first subtracting this number of counted microseconds by the number of microseconds that would have occurred had the motor been moving at the desired speed. This difference is then divided by the number of microseconds that would occur in each ¼ degree of rotation at desired speed.

The calculated phase_loss is then subtracted from phase_lead to produce a current value of phase_lead. These calculations are repeated below for clarity:

| | | |
|---|---|---|
| measured_usecs | = | # of microseconds counted between 2 tachs |
| desired_usecs | = | # of microseconds that would be counted during one tach |
| interval at desired speed | = | 1,000,000/*FPS*/(12 tachs/frame) |
| delta_usecs | = | measured_usecs − desired_usecs |
| quarter_degree | = | # of usecs that would be counted during 1/4 degree at desired speed |
| | = | 1,000,000/*FPS*/(360*4) |
| phase_loss | = | delta_usecs/quarter_degree |
| current phase_lead | = | previous phase_lead − phase_loss |

If at the beginning of the Half Cruise State, the shutter leads the sync by 180°, then after one shutter revolution, the shutter and sync would be in line with each other.

When the motor rises from half speed to full speed, it loses some phase with respect to the sync during this period. This amount of phase, called rise_phase_loss, is less than the amount of phase that would have been lost had the camera remained at half speed over the same interval. The optimum time for the motor to accelerate from half speed to full speed is when the phase_lead is equal to the rise_phase_loss. Then, the phase_lead will equal zero at the instant the motor reaches full speed. The control system and method of the present invention knows exactly what the value of rise_phase_loss is by measuring how much phase was lost the last time it rose from half speed to full speed.

A non-zero phase between the motor and the synchronization signal may be desired, and this will be called the desired_phase_lead. The desired value of phase_lead when the motor begins rising will be called the target_phase. Hence, target_phase=desired_phase_lead+rise_phase_loss After the phase lead is calculated, software processing occurs to make the decision to accelerate to full speed. During this processing time, the motor spinning at half speed loses an amount of phase called proc_phase_loss, where $$proc\_phase\_loss = \frac{(microseconds\ of\ processing)}{quarter\_degree}$$

As discussed above, a very small phase lag, such as where the sync pulse occurs just before the shutter opens, causes an entire dark frame. To guard against dark frames, if the initial phase_lead is less than the sum of the target_phase and the proc_phase_loss, then 360° of phase are added to the phase_lead so that the control scheme of the present invention waits a full cycle before accelerating to full speed. This is the worst case scenario for coming up to speed and into phase quickly.

At each tach, the control system and method of the present invention decides if it needs to wait at least another tach before accelerating to full speed, using the following formula:

If (phase_lead−(target_phase+proc_phase_loss)>tach_phase_loss) Then wait at least another tach; Else spin in a loop that reads a hardware timer until the phase_lead exactly equals the sum of target_phase and proc_phase_loss.

This step was empirically found to be absolutely necessary or else the motor could be up to 15 degrees out of phase when it reaches full speed. Such a discrepancy is more than enough to produce blank frames or a visible dark bar.

At this point, the Full Rise State begins. During the Full Rise State, the conventional, linear speed control loop is turned off. The motor accelerates from half speed to full speed at a constant rate until the last tach of this state. During the last tach_interval, a reduced acceleration is calculated to prevent overshooting the desired speed, as was described in reference to the Half Rise State. Because the value of the shutter's phase_lead at the beginning of the Full Rise State was approximately equal to rise_phase_loss, the shutter will be in phase with the sync signal at the end of the rise.

During the Full Shutter State, the conventional, linear, speed control loop is turned on to keep the motor at full speed while waiting for a shutter interrupt. When the next shutter interrupt occurs, the phase_lead is measured and subtracted from the phase_lead measured at the end of the Half Cruise State. The resulting value of rise_phase_loss is used to adjust the previously known value of rise_phase_loss so that the control scheme of the present invention learns how to perform better a next time.

The stored value of rise_phase_loss learns slowly at a rate, learn_rate, set to 0.25. A slow learning rate prevents the system from jumping out of whack with random disturbances, yet when a systematic error occurs, such as a cable replacement, then the rise_phase_loss parameter will migrate to a new, correct value during a few exposure sequences. Consequently:

$$rise\_loss_{Measured}=phase\_lead_{FullCruise}-phase\_lead_{FullRise};$$
$$error=rise\_phase\_loss_{RAM}-rise\_phase\_loss_{Measured};\ new\ rise\_phase\_loss_{RAM}=rise\_phase\_loss_{RAM}+learn\_rate * error$$

The optimal values for the initial motor commands for cruising at both half and full speeds are taken to be the final values used at the end (and therefore during steady-state operation) of each of the cruising states.

The initial motor commands for rising at both half and full speeds are increased or decreased proportional to the difference between the number of tachs used for each rise and the optimal number of four.

During the Full Cruise State, the conventional, linear, speed and phase control loops run to maintain a constant motor speed and phase synchronization. If images are simultaneously being recorded digitally as well as onto cinematic film, then the digital recording would start at the beginning of this state.

Figure 4A:
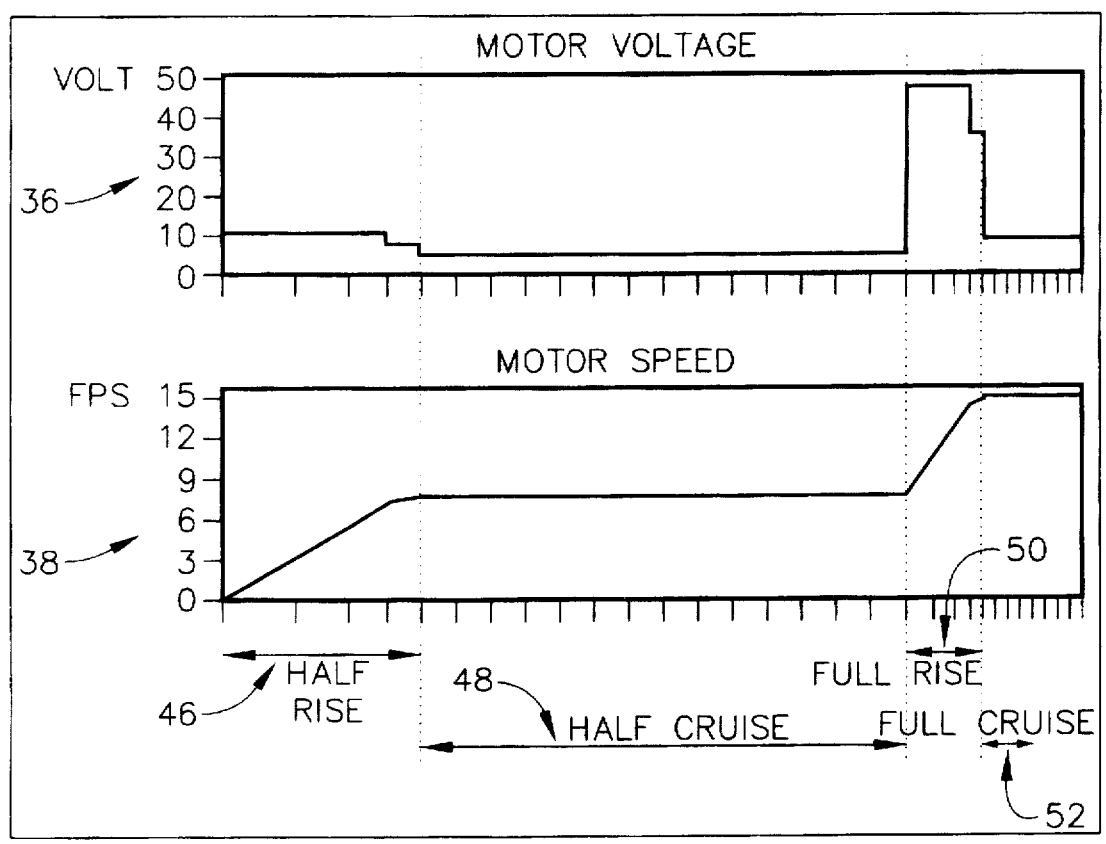
FIG. 4 is a graphical representation of the operation of the control scheme of the present invention.
Figure 4B:
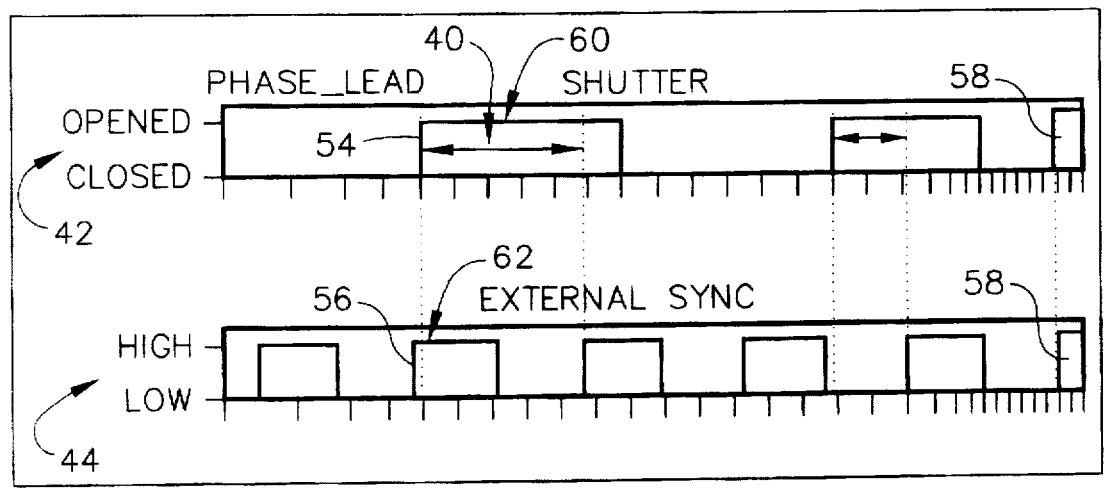

Referring now to FIG. 4, there is illustrated a graphical representation of the operation of the control system and method according to the present invention. The voltage and speed graphs, 36 and 38, respectively, show the relationships between the Half Rise 46, Half Cruise 48, Full Rise 50, and Full Cruise 52 states. Each rising state 46, 50 has three tach_intervals followed by a fourth tach_interval when the voltage and speed slope (acceleration) are reduced to avoid speed overshoot. The tachs occur much farther apart in time when the motor speed is slower. It is this sparse feedback that makes the invention necessary. The diagram of FIG. 4 illustrates a condition that is near worst case, because the rising edge 54 of shutter pulse 60, shown in shutter graph 42, initially occurs just after the rising edge 56 of the external synchronization pulse 62, shown in external synchronization graph 44. This represents 355 degrees of phase_lead 40. The full rise state is entered when the phase_lead equals the rise_phase_loss. Synchronization occurs exactly when the motor reaches full speed, and is apparent at the next shutter 58.

The present invention rapidly brings a motor both up to speed and in phase with an external synchronization signal by first accelerating to half the desired speed. The phase error is then measured, and revolving at half speed continues until the motor accelerates to full speed at the optimal time such that it is in phase just as it reaches full speed. This optimal phase discrepancy is adaptively learned. The present invention overcomes the overshoot inherent in a speed control system with sparse feedback by accelerating at a constant, yet slow enough, rate to receive at least three speed feedbacks. Then the instantaneous speed can be accurately measured and the next (and final speed) command during acceleration is interpolated between the command for rising and the command for cruising at the desired speed. The "rising" and "cruising" commands are adaptively learned.

It will be obvious to those skilled in the art that various modifications and variations of the present invention are possible without departing from the scope of the invention, which rapidly brings a cinematic motor up to speed and in phase with a synchronization pulse while minimizing access time and wasted film.

The invention has been described in detail with particular reference to certain preferred embodiments thereof, but it will be understood that modifications and variations can be effected within the spirit and scope of the invention.

What is claimed is:

1. A method for controlling a motor to rapidly accelerate and synchronize with an external synchronization pulse, comprising the steps of:

accelerating the motor to only half of a desired speed;

calculating a phase error with a synchronization pulse to determine a phase discrepancy;

allowing the motor to cruise at half speed Iuntil the phase discrepancy diminishes;

increasing motor speed to be in phase with the synchronization pulse just as the motor reaches full desired speed.

2. A method for controlling a motor as claimed in claim 1 further comprising the steps of:

providing a default value of the phase discrepancy that diminishes while rising from half to full speed;

automatically calibrating the default value after each run to provide a new default value; and storing the new default value for use on a subsequent run.

3. A method for controlling a motor as claimed in claim 1 further comprising the step of performing motor acceleration at a constant rate, capable of receiving at least three speed feedbacks.

4. A method for controlling a motor as claimed in claim 3 further comprising the steps of:

accurately measuring instantaneous speed;

interpolating a next speed command during acceleration between an ideal command for rising and an ideal command for cruising at the desired speed.

5. A method for controlling a motor as claimed in claim 4 wherein the ideal command for rising accelerates the motor as fast as possible, while still being able to obtain at least three speed feedbacks.

6. A method for controlling a motor as claimed in claim 5 wherein after each run the ideal command for rising at both half and full speeds is increased or decreased proportional to a difference between the number of feedbacks acquired on each rise and an optimal number, to generate adjusted values.

7. A method for controlling a motor as claimed in claim 6 wherein the optimal number is at least three.

8. A method for controlling a motor as claimed in claim 6 wherein the optimal number is not greater than four.

9. A method for controlling a motor as claimed in claim 6 further comprising the step of storing the adjusted values for use on a subsequent run.

10. A method for controlling a motor as claimed in claim 4 wherein the ideal command for cruising is measured from commands used for cruising during steady-state portions of a previous run.

11. A motor control system for controlling a motor to rapidly accelerate and synchronize with an external synchronization pulse, comprising:

means for accelerating the motor to only half of a desired speed;

a phase error calculated with a synchronization pulse to determine a phase discrepancy;

means for allowing the motor to cruise at half speed until the phase discrepancy diminishes;

means for increasing motor speed to be in phase with the synchronization pulse just as the motor reaches full desired speed.

12. A motor control system as claimed in claim 11 further comprising:

a default value of the phase discrepancy that diminishes while rising from half to full speed;

means for automatically calibrating the default value after each run to provide a new default value; and storage means for storing the new default value for use on a subsequent run.

13. A motor control system as claimed in claim 11 further comprising means for accelerating the motor at a constant rate, capable of receiving at least three speed feedbacks.

14. A motor control system as claimed in claim 13 further comprising:

an accurate measurement of instantaneous speed;

a next speed command interpolated during acceleration between an ideal command for rising and an ideal command for cruising at the desired speed.

15. A motor control system as claimed in claim 14 wherein the ideal command for rising accelerates the motor as fast as possible, while still being able to obtain at least three speed feedbacks.

16. A motor control system as claimed in claim 15 wherein after each run the ideal command for rising at both half and full speeds is increased or decreased proportional to a difference between the number of feedbacks acquired on each rise and an optimal number, to generate adjusted values.

17. A motor control system as claimed in claim 16 wherein the optimal number is at least three.

18. A motor control system as claimed in claim 16 wherein the optimal number is not greater than four.

19. A motor control system as claimed in claim 16 further comprising means for storing the adjusted values for use on a subsequent run.

20. A motor control system as claimed in claim 14 wherein the ideal command for cruising is measured from commands used for cruising during steady-state portions of a previous run.

* * * * *